United States Patent [19]

Ross

[11] Patent Number: 4,550,983

[45] Date of Patent: Nov. 5, 1985

[54] MAGNETO-OPTIC DEVICE FOR THE CONTROL OF ELECTROMAGNETIC RADIATION

[75] Inventor: William E. Ross, Woodland Hills, Calif.

[73] Assignee: Litton Systems, Inc., Beverly Hills, Calif.

[21] Appl. No.: 492,584

[22] Filed: May 9, 1983

[51] Int. Cl.⁴ ............................................. G02F 1/09
[52] U.S. Cl. ................................... 350/376; 340/763; 365/3
[58] Field of Search ............... 350/355, 356, 375, 376, 350/377–379; 365/1, 3; 348/763

[56] References Cited

U.S. PATENT DOCUMENTS

| | | | |
|---|---|---|---|
| 3,150,356 | 9/1964 | Newman | 350/376 |
| 3,158,673 | 11/1964 | Sites | 350/376 |
| 3,798,622 | 3/1974 | O'Dell | 365/3 |

*Primary Examiner*—Bruce Y. Arnold

[57] ABSTRACT

A magnetic domain device has at least one post element formed from a material that exhibits magnetic domain characteristics and that is positioned on a non-magnetic substrate material. A pair of electrical drive lines associated with a post element permit coincident current selection of the post element to reverse the direction of magnetization of the post element. This reversal is enhanced by one of the drive lines being configured to a slope portion of the post element so that this drive line is oriented to require a minimum field to reverse the magnetization direction of the post element.

12 Claims, 7 Drawing Figures

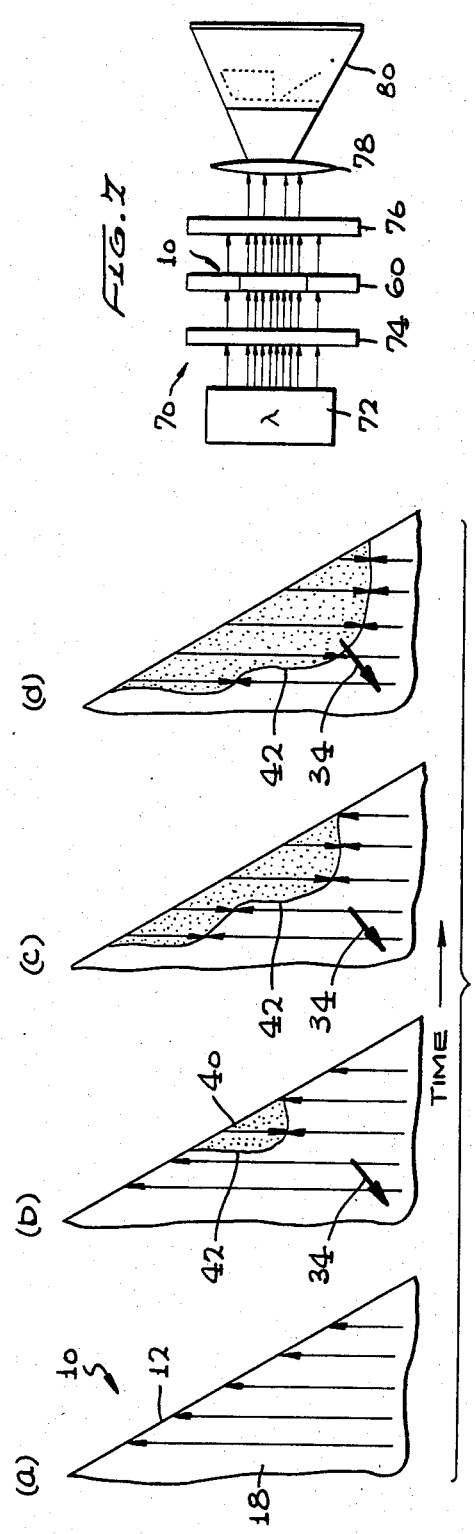
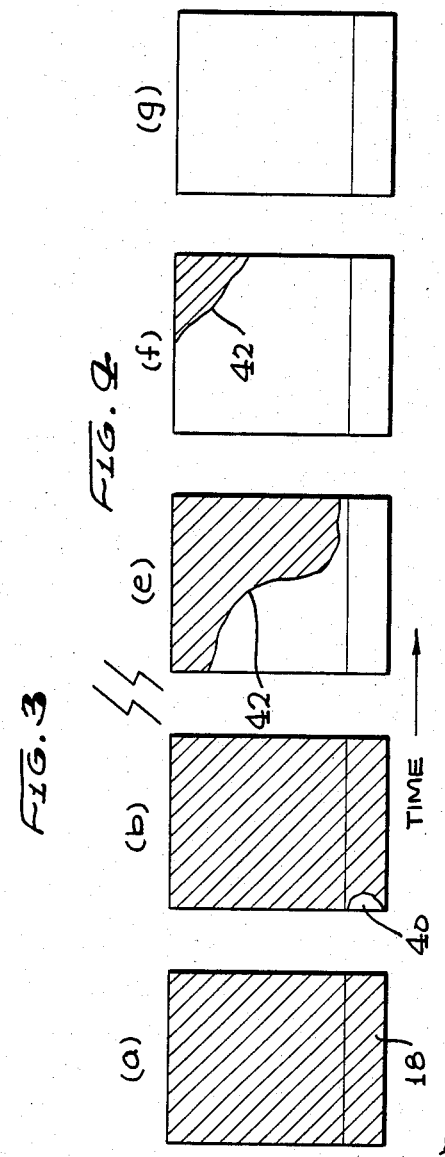

MAGNETO-OPTIC DEVICE FOR THE CONTROL OF ELECTROMAGNETIC RADIATION

TECHNICAL FIELD

A material that exhibits magnetic domain characteristics is formed into a magnetic domain device for the control of electromagnetic radiation for use in a magneto-optic display. The magnetic domain device has at least one conductor drive line configured to complement the physical geometry of a volume of the magnetic domain material.

BACKGROUND ART

In the field of magnetic domain devices, materials that exhibit magnetic domain characteristics, the behavior of such magnetic domains, and the use of these magnetic domain materials in sensing and display devices have been described: see United Kingdom Pat. No. 1,180,334; Krumme, J-P. et al., "Ferrimagnetic Garnet Films of Magneto-optic Information Storage", IEEE Transactions on Magnetics, Vol. Mag-11, No. 5, September 1975, page 1097; Lacklison, D. E. et al., "The Magneto-optic Bubble Display", IEEE Transactions on Magnetics, Vol. Mag-13, No. 3, May 1977, page 973; Lacklison, D. E. et al., "Magnetic-Optic Displays", IEEE Transactions on Magnetics, Vol. Mag-13, No. 3, May 1977, page 973; Lacklison, D. E. et al., "Magneto-Optic Displays", IEEE Transactions on Magnetics, Vol. Mag-11, No. 5, September 1975, page 1118; Hill, B. and Schmidt, K. P., "Fast Switchable Magneto-Optic Memory Display Components", Philips Journal of Research, Volume 33, Nos. 5/6, 1978, page 211; Almasi, G. S., "Magneto-optic Bubble-Domain Devices", IEEE Transactions on Magnetics, Vol. Mag-7, No. 3, September 1971, page 370; U.S. Pat. No. 3,815,107; and, U.S. Pat. No. 3,526,883.

Magneto-optic or magnetic domain display devices can employ either the Faraday effect which depends on the change in rotation of the plane of polarization of electromagnetic radiation, such as polarized light, as it is transmitted through a magnetic domain, or the Kerr effect which depends on radiation reflected by a magnetic domain. In accordance with the Faraday effect, if the transmitted radiation is plane polarized, passed through a magnetic domain, and then through an analyzer, the intensity of the radiation which has been so transmitted is either greater than or less than that radiation which is transmitted through adjoining domains, as opposite direction of magnetization provided that the analyzer is adjusted to extinguish radiation in one direction of magnetization. This resulting contrast in radiation intensities is the basis for magnetic domain display devices.

One form of magnetic domain display devices utilize the propagation of magnetic domains either along a propagation track (U.S. Pat. Nos. 3,526,883; 3,815,107 and 3,824,570), or inhibit the migration of a propagated magnetic domain by positioning a ferrimagnetic material on the magnetic domain material (U.S. Pat. Nos. 3,516,883 and 3,893,023), or etch or scribe a line in the material surface (U.S. Pat. No. 3,798,622).

Propagation of magnetic domains can also be controlled by guide channels or mesas (MAGNETIC BUBBLES, Selected Topics in Solid State Physics-Volume XIV by A. H. Bobeck and E. Della Torre, North-Holland Publishing Company, Amsterdam, Holland, 1975, pp 165-5), and by stable magnetic domain positions having channel walls which act as high energy barriers (U.S. Pat. No. 4,059,829).

Since the propagation of magnetic domains is not always desired, another form of magnetic domain display devices utilize an individual and intrinsic magnetic domain that is physically constrained so that the domain generally cannot move, while the direction of magnetization of the individual and intrinsic magnetic domain can be changed or switched ("Fast Switchable Magneto-Optic Memory Display Components", supra; and U.S. Pat. No. 4,114,191).

When it is necessary to change the direction of magnetic orientation of a magnetic domain, and the domain is a single wall region closed upon itself, the field required to annihilate or change a selected magnetic domain is relatively high so that an external bias field is required (U.S. Pat. No. 4,114,191). Where an external bias field is not required, the physical orientation of the drive lines with respect to a memory area or defined volume becomes complex and, therefore, costly (United Kingdom Pat. No. 1,180,334).

This invention, a magnetic domain device for the control of electromagnetic radiation, overcomes the disadvantages of the prior art by drive lines configured to complement the physical geometry of a volume of a material that exhibits magnetic domain characteristics. This also results in a significant reduction in the drive field required to change the direction of magnetic orientation of a region in the volume that is partly defined by a single wall which is not closed upon itself as is a conventional magnetic bubble domain, and eliminates the need for an external bias field.

DISCLOSURE OF INVENTION

The invention as claimed is an improved magnetic domain device that eliminates the need for an external bias field to assist in the switching of the magnetic orientation of a magnetic domain region, and that reduces the drive currents necessary to establish a drive field to switch the magnetic orientation of a magnetic domain region in a volume of magnetic material that exhibits magnetic domain characteristics.

These advantages of the invention are realized by the physical geometry of the volume of magnetic material, and by a pair of electrical conductors which are configured to the geometry of the volume. This results in a significantly reduced drive field and a lower field requirement both to nucleate a single magnetic domain wall and to drive the single domain wall when compared to the field requirement of prior art magneto-optic displays to collapse a magnetic domain in a physical volume of magnetic material.

BRIEF DESCRIPTION OF THE DRAWINGS

The invention is described in detail below with reference to the drawings that illustrate one specific embodiment, in which:

FIG. 3 is a schematic time sequence of the physical changes in direction of magnetic field orientation that occurs during operation of the magnetic domain device of the invention as viewed in cross-section and partly broken away.

FIG. 4 is a plan view in schematic sequence of the magnetic domain device of the invention including the schematic sequence of FIG. 3.

FIG. 7 is a block diagram of one form of display device incorporating the wafer of FIG. 6.

BEST MODE OF CARRYING OUT THE INVENTION

Figure 1:
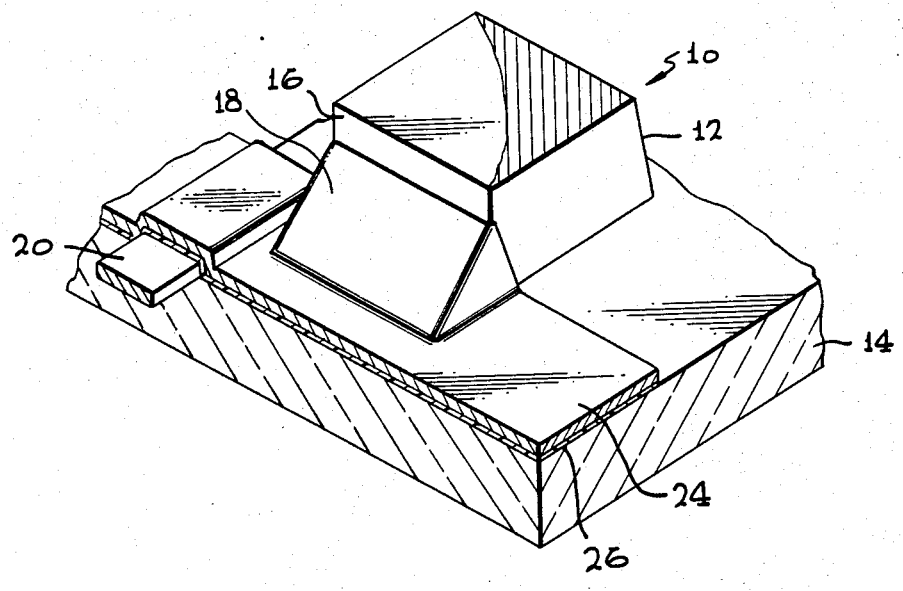
FIG. 1 is an enlarged perspective view, partly broken away, of a magnetic domain device of the invention.

The magnetic domain device 10 of the invention is formed from a film layer 12 that is supported by a substrate 14. The magnetic domain device 10 can be formed by etching the film layer 12. Either chemical or ion etching can be used; however, chemical etching is preferred for the invention.

The film layer 12 from which the device 10 is formed can be a relatively thin, e.g. 10 μm, layer of material selected to exhibit magnetic domain characteristics and preferably high Faraday rotation. The material can be a ferrimagnetic garnet composition, such as bismuth substituted iron garnet, which can be prepared by liquid phase epitaxy deposition on the film support material or substrate 14. The substrate 14 can be relatively thick, i.e. greater than 10 μm. The material of the substrate 14 is selected to exhibit nonmagnetic and optically transparent characteristics; for example, gadolinium gallium garnet (GGG).

The process of etching the film layer 12 into the magnetic domain device 10 develops a post or mesa geometry which is supported by the substrate 14. At least one sidewall of the post, sidewall 16, is formed with a toe-slope portion 18 which is more clearly shown by FIG. 2 as having a slope.

Figure 2:
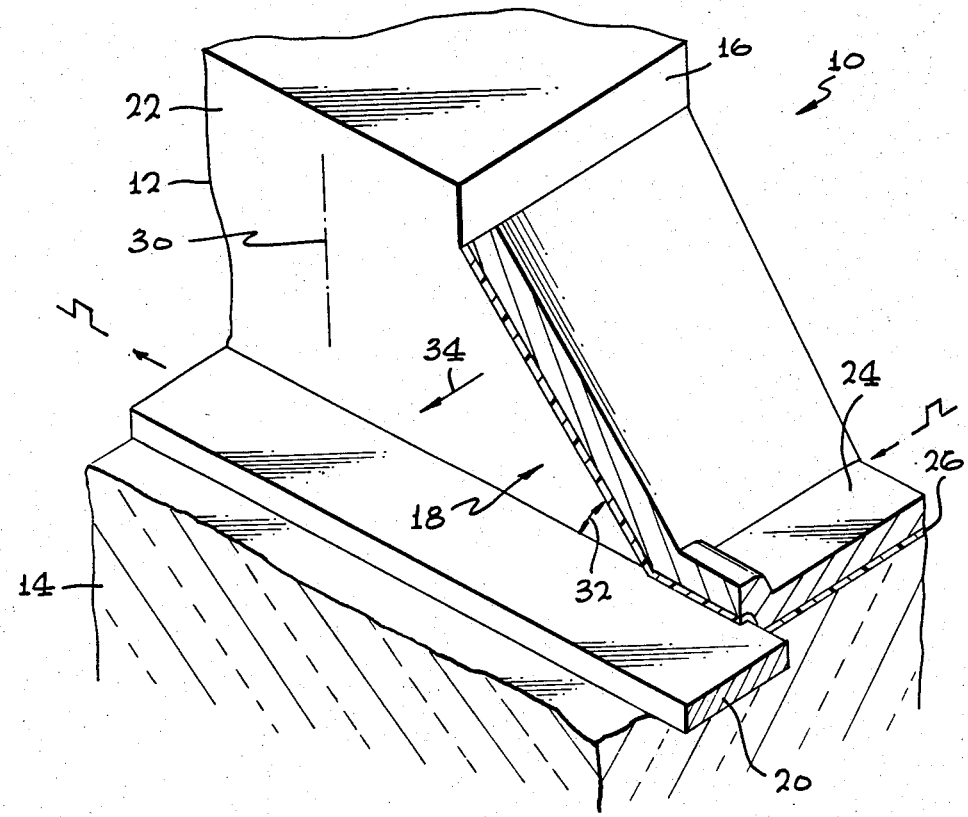
FIG. 2 is an enlarged perspective view, partly broken away and cross-sectioned, of the magnetic domain device of FIG. 1.

Referring to FIGS. 1 and 2, one electrical conductor 20 is positioned along sidewall 22 of the post 10. A second electrical conductor 24 is orthogonally positioned along adjoining sidewall 16, and is particularly positioned along and over the toe-slope portion 18. Electrical conductor 24 is electrically insulated from conductor 20 by a layer 26 of electrically nonconductive material.

Coincident-current selection is used in the invention to reverse the magnetization direction within the magnetic domain device 10. This reversal is in the direction of an easy axis 30 of the film layer 12 where the easy axis is oriented perpendicular to the perspective plane of the drawing for FIGS. 1 and 2.

It is known that the direction of magnetization M along the easy axis 30 can be reversed by the application of a magnetic field $H=H_k-4\pi M_s$ in a direction opposite to M. The source of this field is the orthogonal electrical conductors 20 and 24 which, when sufficient current is applied to the conductors, establishes a magnetic field having a strength equal to or greater than H. Usually, the field from either conductor by itself is less than H; however, in the region where the conductors crossover at adjoining sidewalls 16 and 22, the individual conductors fields are additive to at least H and the reversed direction of magnetization M or switching occurs.

It has been determined that the fields produced by the conductors are generally not perpendicular to the film layer 12, and therefore not parallel with the easy axis 30. Accordingly, the field required for switching the direction of magnetization M will be less than H. A field $H_{eff}$ applied along the easy axis of the film has a switching effect equivalent to a field with an in-plane component $H_{ip}$ and a normal component $H_z$. Thus, $$H_{eff} = [(H_z)^{\frac{2}{3}} + (H_{ip})^{\frac{2}{3}}]^{3/2} \qquad (1)$$

Field $H_{eff}$ has a maximum value of 2H when $H_{ip}=H_z$, when the external field H is oriented at 45° with respect to the easy axis 30.

The static orientation of the magnetization M in a thin-film uniaxial magnetic material is obtained by minimizing the magnetic potential energy E with respect to the direction of M. In such cases, E is given by:

$$E = -M_sH_z \cos\theta - M_sH_{ip}\sin\theta - K_u\cos^2\theta + 2\pi M_s^2 \cos^2\theta \qquad (2)$$

where
- $H_z$ = external field applied normal, i.e. along the easy axis 30, to the film layer 12
- $H_{ip}$ = external field applied in the plane of the film layer
- $K_u$ = anisotropy energy density
- $M_s$ = M
- $\theta$ = polar angle of M with respect to the easy axis of the film layer.

The first two energy terms $H_z$ and $H_{ip}$ tend to align M along the external field $H_z$, while the third term $K_u$ represents the uniaxial anisotropy. $K_u$ tends to align M with the easy axis 30 which is normal to the film layer 12. The last term $\theta$ represents the demagnetizing effect from the thin-film geometry, and tends to align M in the plane of the film layer.

The static value of $\theta$ satisfies $\delta E/\delta\theta = 0$ or $$M_sH_z\sin\theta - M_sH_{ip}\cos\theta + 2(K_u - 2\pi M_s)\cos\theta\sin\theta = 0 \qquad (3)$$

For this solution to be stable, $\delta E^2/\delta\theta^2 \geq 0$ or $$M_sH_z\cos\theta + M_sH_{ip}\sin\theta + 2(K_u - 2\pi M_s)\cos 2\theta \geq 0 \qquad (4)$$

Switching occurs when the external field magnitude is increased until the direction of M becomes unstable. Mathemaically, this occurs when the value of $\theta$ satisfies both Equation 3 and the equality in Equation 4. These two conditions can be used to eliminate $\theta$. The result is a relationship between $H_{ip}$, $H_z$, $K_u$, and $M_s$ that specifies the switching condition of Equation (1) where $$H_{eff} = \frac{1}{2}H = 2(K_u - 2M_s)M_s^2 \qquad (5)$$

a minimum field magnitude is required for switching $H_{eff}$, or $\frac{1}{2}H_k$ when the external field is oriented 45° with respect to the normal or easy axis 30. For other orientations, the field is higher, and reaches a maximum of $H_k$ when the field is either in the plane of the film layer 12 or normal to it.

Chikazumi[1] credits D. O. Smith[2] and Olson and Pohm[3] for this discovery.

[1] S. Chikazumi and S. H. Charap, *Physics of Magnetism*, John Wiley & Sons (New York, 1964)
[2] D. O. Smith, J. Appl. Phys. 29, 264 (1958)
[3] C. D. Olson and A. V. Pohm, J. Appl. Phys. 29, 274 (1958)

In the invention, particularly as shown by FIGS. 1 and 2, the desired 45° orientation of the external magnetic field to the magnetic domain device 10 results from positioning electrical conductor 24 on the toe-slope portion 18 of sidewall 16. Although the toe-slope angle 32 is preferably at or near 45° as is possible and practical through known etching processes, it can be 30° to 60° and still realize most of the benefits of the reduced magnetic field $H_{eff}$ because of the angular orientation of the field, as represented by $H_{eff}$ arrow 34, with respect to the normal or easy axis 30 of the film layer 12.

Referring to FIGS. 3 and 4, the direction of magnetization in the magnetic domain device 10, when no external magnetic field is applied, is shown by FIGS. 3(a) and 4(a). For description purposes, the direction of magnetization is arbitrarily designated as "up", i.e. north polarity is away from the substrate 14 and parallel with the easy axis 30 (see FIG. 2), and is shaded in the drawing. Upon the application of the external magnetic field designated by $H_{eff}$ arrow 34 in FIG. 3(b), nucleation of a magnetic domain reversal occurs generally at nucleation site 40. Nucleation that occurs at site 40 is evidenced by a reversal or coherent rotation of the direction of magnetization of the film layer 12 so that the direction of magnetization within the nucleation site is "down", and is unshaded in the drawing. The nucleation site 40 and the remainder of the film layer 12 in FIG. 3(b) thus represent volumes of film layer material having opposite directions, up and down, of magnetization. These volumes meet at a discernable boundary line or single domain wall 42. It is understood that the nucleation site 40 may not be visible since the toe-slope portion 18 is overlaid with electrical conductor 24 and insulation layer 26 as shown by FIGS. 1 and 2.

Continued application of the external magnetic field after nucleation, drives or moves the domain wall 42 through the film layer 12 of the magnetic domain device 10 so that the resulting volume material, which exhibits a "down" direction of magnetization, increases as the "up" volume decreases. This is schematically illustrated by FIGS. 3(c), (d) and FIGS. 4(e), (f). If the external magnetic field is greater than the saturation or collapse field, and is applied for a sufficient period of time which is readily determinable, the domain wall 42 will sweep entirely through the film layer 12 of the magnetic domain device 10 so that the direction of magnetization is reversed from the total "up" and shaded direction of FIG. 4(a) to the total "down" and unshaded direction of FIG. 4(g).

INDUSTRIAL APPLICABILITY

Figure 5:
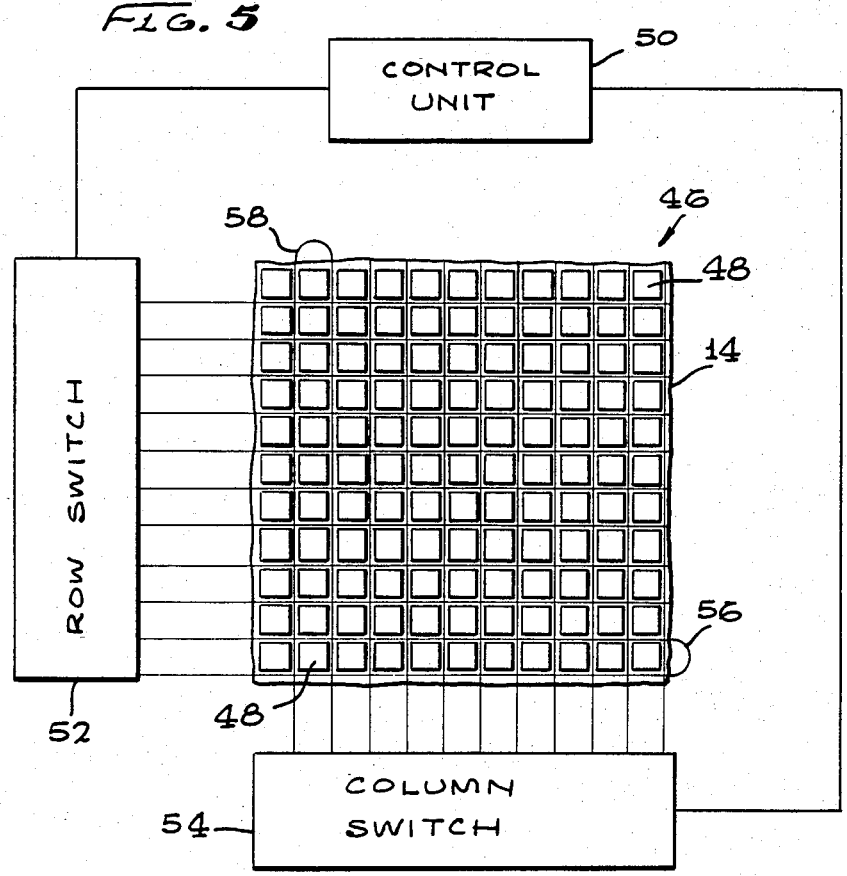
FIG. 5 is a simplified plan view of one magneto-optic chip that utilizes the magnetic domain device of the invention.

The magnetic domain device 10 of the invention has application in a magneto-optic chip 46 as shown by FIG. 5 where a plurality of similar posts 48 are formed from the film layer 12 of the device 10 (see FIGS. 1 and 2) in a row-and-column orientation, and are supported by substrate 14. The magneto-optic chip 46 has control and drive electronics that include a control unit 50, and row-and-column switches 52 and 54, respectively, which are connected to associated row-and-column conductors 56 and 58. Only one row conductor 56 and one column conductor 58 are shown for clarity of illustration; however, the magneto-optic chip 46 has a plurality of row-and-column conductors similar to conductors 56 and 58 that are positioned, as more clearly shown by FIGS. 1 and 2, to act upon each of the posts 48. This resulting matrix of row-and-column conductors permits the application of a magnetic field to a selected post 48 by coincident current select of those conductors that act upon the selected post. This selection of a post or posts is implemented by the control unit 50 that commands the appropriate row-and-column switches 52 and 54 to pass an electric current through each of the selected conductors.

Figure 6:
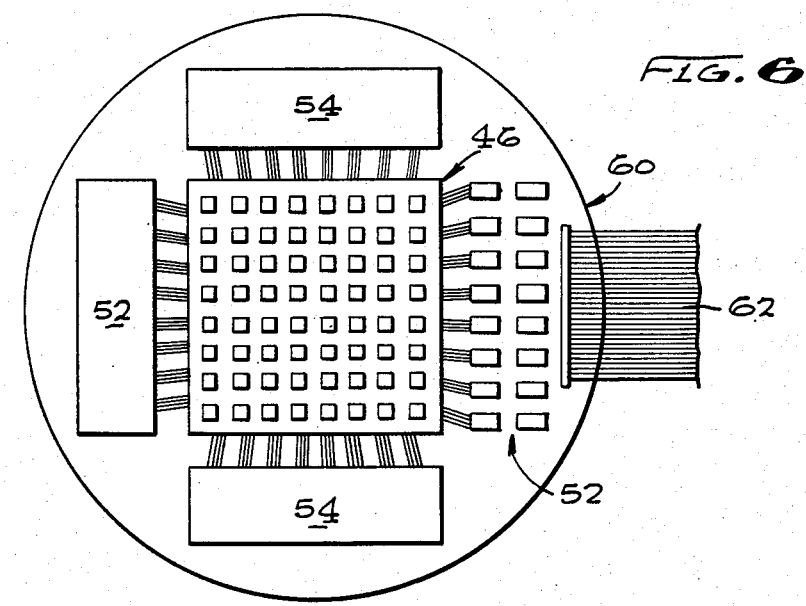
FIG. 6 is a plan view of one form of wafer that incorporates the magneto-optic chip of FIG. 5.

Referring to FIGS. 6 and 7, the magneto-optic chip 46 can be supported by a wafer 60 that is used in one display device 70 as shown by FIG. 7. The row and column switches 52 and 54, which can include additional switch circuitry, can be positioned on the wafer 60 and connected to the control unit 50 (not shown, but similar to the control unit 50 of FIG. 5) by a suitable conductor cable 62. The display device 70 of FIG. 7 has a source of radiation 72 of wave length λ. If the source 72 does not emit linearly polarized radiation, a polarizer 74 is positioned between the source 70 and the magneto-optic chip 46 that is carried by wafer 60. The plane polarized radiation is incident on the chip 46 where the selected magnetic orientation of each of the posts 48 determine the direction of rotation, either positive or negative—clockwise or counterclockwise, of the radiation as it passes through each of the individual posts of magneto-optic material in accordance with the Faraday effect. An analyzer 76 is arranged to block radiation that has been rotated in a selected direction. The selected radiation that passes through the analyzer 76 can be viewed either directly on the surface of the analyzer, or can pass through suitable optics 78 for again direct viewing or projection on a display surface 80.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A magnetic domain device comprising:
   (a) a non-magnetic substrate transparent to electromagnetic radiation,
   (b) a magnetic layer on said substrate,
   (c) a mesa formed in said magnetic layer,
   (d) a sloping sidewall extending outwardly from said mesa adjoining said substrate,
   (e) a first electrical conductor positioned along a sidewall of said mesa adjoining said sloping sidewall,
   (f) an electrical insulator on said first electrical conductor and at least said sloping sidewall, and
   (g) a second electrical conductor positioned along said mesa at least on said sloping sidewall.

2. The magnetic domain device of claim 1 in which said sloping sidewall has a slope of 45° from said substrate.

3. The magnetic domain device of claim 1 in which said sloping sidewall has a degree of slope from said substrate between 30° and 60°.

4. The magnetic domain device of claim 1 in which said first electrical conductor is positioned on said substrate.

5. The magnetic domain device of claim 1 in which said first electrical conductor is positioned on said magnetic layer and said electrical insulator is further positioned between said first electrical conductor and said magnetic layer.

6. The magnetic domain device of claim 1 in which said mesa has an outwardly facing surface and said second electrical conductor is positioned on said sloping sidewall and an adjoining portion of said lens surface.

7. A magnetic domain device for the control of electromagnetic radiation comprising:
   (a) a non-magnetic substrate transparent to electromagnetic radiation,
   (b) a magnetic layer positioned on said substrate,
   (c) a plurality of mesas formed in said magnetic layer, respective ones of said plurality of mesas spaced-apart from adjacent ones and oriented in rows and columns,
   (d) each of said mesas having a sloping sidewall oriented in a direction common to that of such other sloping sidewalls,
   (e) a first electrical conductor positioned along each column on an adjoining sidewall to said sloping sidewall of each of said adjacent mesas,
   (f) an electrical insulator on said first electrical conductors and at least said sloping sidewall,
   (g) a second electrical conductor positioned along each row generally orthogonal to said first electrical conductor, and at least on said sloping sidewalls of adjacent mesas, and
   (h) a control means connected electrically to said first and second electrical conductors so that at least one selected mesa affects electromagnetic radiation passing therethrough.

8. The magnetic domain device of claim 7 in which said mesas are posts.

9. A magnetic domain device for the control of electromagnetic radiation comprising:
   (a) at least one physically defined volume of magnetic material,
   (b) an outwardly facing surface on said volume,
   (c) a pair of first and second adjoining, orthogonal surfaces on said volume, said pair of adjoining surfaces abutting said outwardly facing surface,
   (d) a first surface of said pair of adjoining surfaces having a toe slope portion,
   (e) a first electrical conductor positioned along said second surface of said pair of adjoining surfaces,
   (f) a second electrical conductor electrically insulated from both said volume and said first electrical conductor, said second conductor positioned at least on said toe slope portion of said first surface, and
   (g) control means electrically connected to said first and second electrical conductors, said control means determining the generation of a nucleation field generally at the intersection of said first and second electrical conductors to nucleate a single domain wall in said volume, and further determining the propagation of said domain wall within said volume.

10. The magnetic domain lens of claim 9 in which said second conductor is positioned on said toe slope portion, said first surface, and an adjoining portion of said lens surface.

11. The magnetic domain lens of claim 9 in which said toe slope portion is oriented 45° from said first surface.

12. The magnetic domain lens of claim 9 in which said toe slope portion is oriented between 30° and 60° from said first surface.

* * * * *